Dec. 5, 1944.　　　　C. B. WOOTEN　　　　2,364,335
LEAF SEPARATOR
Filed Nov. 24, 1941

INVENTOR
C. B. Wooten
BY
Webster & Webster
ATTYS

Patented Dec. 5, 1944

2,364,335

UNITED STATES PATENT OFFICE 2,364,335

LEAF SEPARATOR

Cecil B. Wooten, El Nido, Calif.

Application November 24, 1941, Serial No. 420,173

1 Claim. (Cl. 209—136)

This invention relates in general to a leaf separator and in particular the invention is directed to, and it is my principal object to provide a portable leaf separator especially designed for use in orchards to effect separation of the leaves from fruit, such as prunes, as the latter are being harvested.

Another object of my invention is to provide a leaf separator for the purpose described which is readily portable by hand but power driven by a light-weight gas engine or other power means mounted in unitary relationship with the device.

An additional object of the invention is to provide a leaf separator wherein separation of the leaves from the fruit is accomplished by means of a unique separating mechanism which employs an air blast to divert the leaves from the fruit as the latter flow gravitationally through the device.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
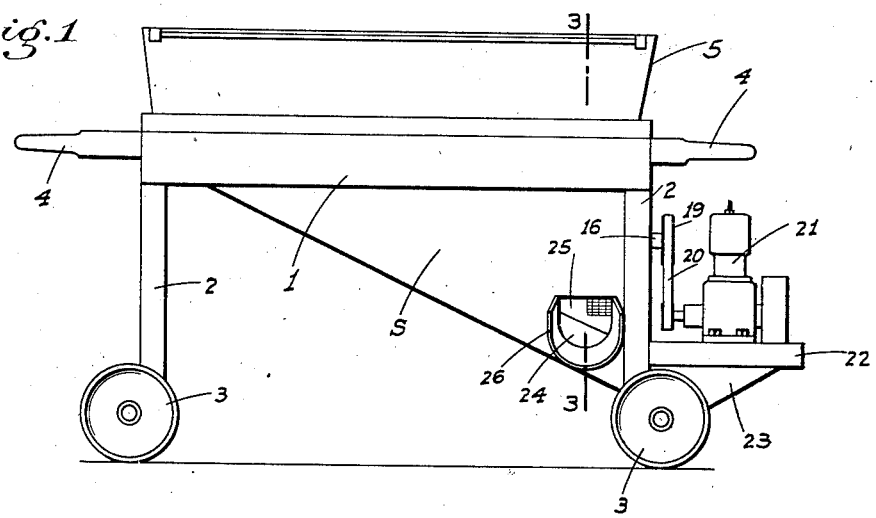
Figure 1 is a side elevation of my improved and portable leaf separator.
Figure 2:
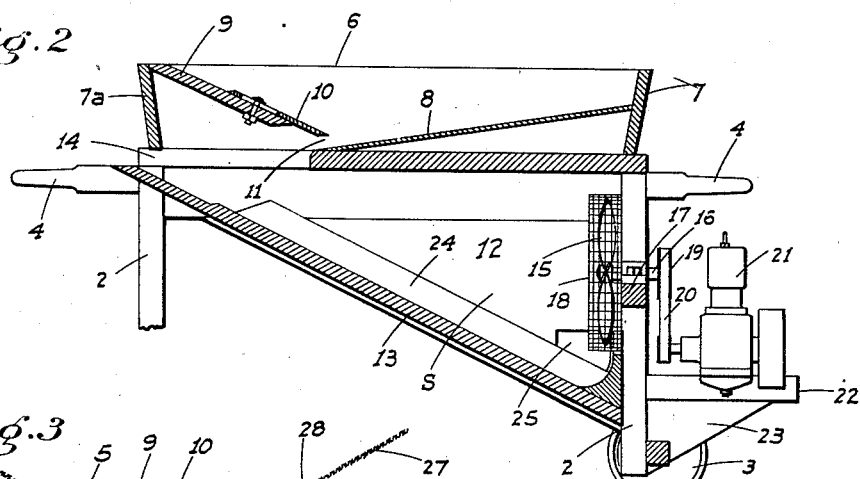
Figure 2 is a longitudinal sectional elevation of the leaf separator.
Figure 3:
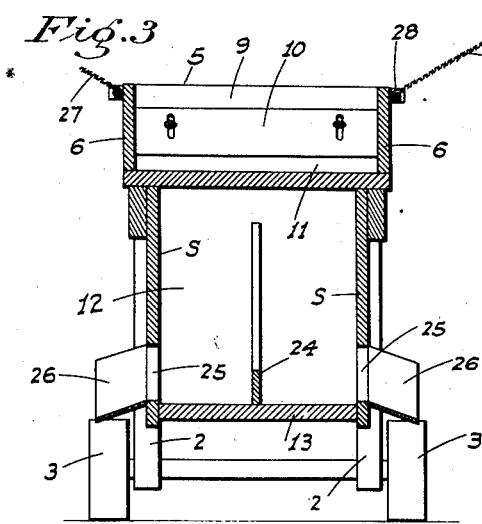
Figure 3 is a cross section taken on line 3—3 of Fig. 1.

Referring now more particularly to the characters of reference on the drawing, the leaf separator comprises an upstanding frame, indicated generally at 1, of rectangular elongated configuration in plan, and including legs 2 projecting downwardly from the corners. The legs are preferably supported by ground engaging wheels 3, which may be removed or omitted if desired. Pairs of transversely spaced handles 4 project lengthwise of the device and away from opposite ends thereof, such handles being employed to move the device from place to place in an orchard.

At the top the frame 1 supports an upwardly opening hopper 5 of substantially the same plan as said frame, and including side members 6 and end members 7 and 7a. The bottom of the hopper comprises a relatively long floor section 8 which extends at a downward slope from one end member 7 and terminates at the lower end a substantial distance short of the other end member 7a. A relatively short floor section 9 extends from said other end member 7a at a downward slope toward floor section 8 but terminating at its lower end short of and in a plane some distance above the corresponding end of said floor section 8. A flat transverse gate 10 is secured on top of floor section 9 adjacent its lower edge and projects downwardly beyond said edge sufficient to overhang the corresponding edge of floor section 8 in spaced relation thereabove; the gate 10 being adjustable toward or away from the floor section 8 whereby to regulate the gap 11 therebetween.

Below the hopper 5 the device is formed with a substantially enclosed separating chamber 12 included between sidewalls S and having a sloping relatively steep bottom 13, the upper end of which projects in spaced relation below end member 7a, whereby to provide a transversely extending air outlet slot 14. At the end opposite slot 14 chamber 12 is relatively deep and a fan 15 is mounted in the chamber at said end on a horizontal, longitudinally extending shaft 16 which is suitably journaled on a cross member 17 and projects outward to a termination exteriorly of the chamber. The fan is adapted to create a blast of air in chamber 12 in a direction against and upwardly along the bottom 13 whence such blast discharges through slot 14. The fan may be encased in a suitable mesh cage 18, and the adjacent end of the frame is open as shown so that a stream of air may be drawn into the fan from ahead of the frame.

The outer end of the shaft 16 is fitted with a pulley 19 driven by an endless belt 20 from a light-weight gas engine 21 or the like mounted on a horizontal shelf or motor base 22 which projects outwardly from said open end of frame 1; this motor base being suitably braced from the adjacent legs 2 as at 23.

The bottom 13 is separated centrally of its side edges by means of an upstanding longitudinal division board 24, and the chamber 12 on opposite sides and at its lower end is formed with outlet or discharge openings 25; there being chutes 26 leading laterally from said openings and adapted to feed the fruit into boxes or sacks.

In use the leaf separator is taken directly into the orchard and is disposed adjacent the trees from which the fruit is being harvested, and preferably between rows of trees whereby the fruit from trees on opposite sides of the device may be readily placed in hopper 5. In order to assist in delivery of the harvested fruit into this hopper laterally extending canvas wings 27 may be employed, such wings being detachably connected as at 28 with the side members 6, and suitably supported at their outer end by means not shown.

From the hopper 5 the fruit, together with leaves which may be intermingled therewith, feeds in regulated quantity through gap 11 below gate 10 and drops onto the upper end of bottom 13 of chamber 12. The fruit then rolls downward along bottom 13, being continuously subjected to the blast from fan 15. This blast effectively separates the leaves from the fruit and drives such leaves out of the device through slot 14; the clean fruit discharging through openings 25 and chutes 26.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A portable fruit and leaf separating device including an upstanding frame, transversely spaced ground engaging wheels adjacent the forward end of the frame, handle means projecting longitudinally and outwardly from the rear end of the frame for lifting the frame from said end about the wheels as an axis and for pushing and guiding the device, a fruit and leaf separating unit mounted in the frame and including a fan, a substantially horizontal shelf formed with and projecting forwardly from the front end of the frame some distance above the ground, and a power plant for driving the fan mounted on said shelf ahead of the vertical plane of the axis of said wheels, whereby when the rear end of the frame is lifted, the power plant acts as a counterbalance.

CECIL B. WOOTEN.